(12) United States Patent
Holden et al.

(10) Patent No.: US 8,548,771 B2
(45) Date of Patent: Oct. 1, 2013

(54) OUT-OF-ROUND CONTAINER DETECTION SYSTEM AND METHOD

(75) Inventors: Carl L. Holden, Big Flats, NY (US);
Scott M. Briggs, Horseheads, NY (US)

(73) Assignee: Emhart Glass S.A., Cham (CH)

( * ) Notice: Subject to any disclaimer, the term of this patent is extended or adjusted under 35 U.S.C. 154(b) by 504 days.

(21) Appl. No.: 12/120,025

(22) Filed: May 13, 2008

(65) Prior Publication Data
US 2009/0287439 A1 Nov. 19, 2009

(51) Int. Cl.
G01B 21/20 (2006.01)
G06F 19/00 (2011.01)

(52) U.S. Cl.
USPC .......... 702/167; 73/597; 209/524; 250/223 B; 702/82

(58) Field of Classification Search
USPC ................... 702/33, 35, 39, 81–84, 127, 128, 702/155, 158–159, 167–171, 188; 73/45.4, 73/597, 626; 250/223 B; 209/524, 526, 209/556; 356/239.4
See application file for complete search history.

(56) References Cited

U.S. PATENT DOCUMENTS

| 3,221,544 | A | * | 12/1965 | Gunkel | 73/626 |
| 4,046,258 | A | | 9/1977 | Damm | |
| 4,368,641 | A | | 1/1983 | McLeod, Jr. | |
| 4,378,494 | A | * | 3/1983 | Miller | 250/223 B |
| 4,557,386 | A | * | 12/1985 | Buckley et al. | 209/556 |
| 4,820,972 | A | | 4/1989 | Scott et al. | |
| 5,591,462 | A | | 1/1997 | Darling et al. | |
| 5,606,129 | A | * | 2/1997 | Lehmann | 73/622 |
| 6,031,221 | A | | 2/2000 | Furnas | |
| 6,808,060 | B1 | | 10/2004 | Giometti | |
| 6,915,894 | B2 | | 7/2005 | Raupp | |
| 6,989,857 | B2 | | 1/2006 | Furnas | |
| 7,060,999 | B2 | | 6/2006 | Juvinall | |
| 7,321,679 | B2 | | 1/2008 | Dordoni et al. | |
| 2003/0168426 | A1 | * | 9/2003 | Yourist | 215/382 |
| 2003/0177850 | A1 | | 9/2003 | Whittington | |
| 2006/0006352 | A1 | | 1/2006 | Juvinall | |
| 2007/0115467 | A1 | | 5/2007 | Juvinall et al. | |

* cited by examiner

*Primary Examiner* — John H Le
(74) *Attorney, Agent, or Firm* — Reinhart Boerner Van Deuren s.c.

(57) ABSTRACT

An improved system and method for automatically inspecting the quality of newly-manufactured containers is disclosed that detects containers that are out-of-round by more than a predetermined amount so that they may be rejected to ensure that containers that are passed are of acceptable quality. One or more ultrasonic sensors are located at fixed positions with reference to a container that is rotated. If any sensor detects that the distance between the sensor and the container falls outside of an acceptable range, the container is rejected.

17 Claims, 6 Drawing Sheets

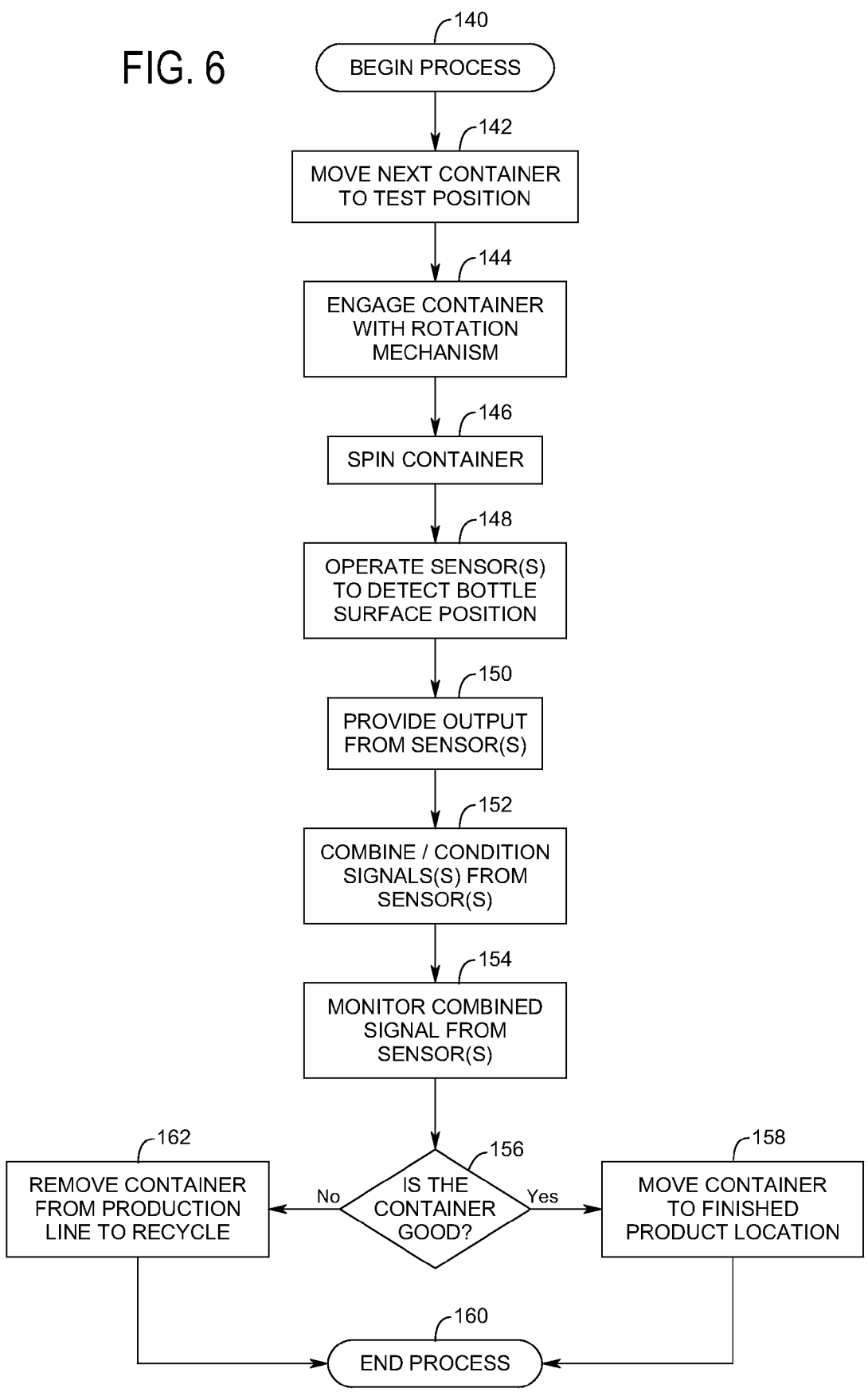

OUT-OF-ROUND CONTAINER DETECTION SYSTEM AND METHOD

BACKGROUND OF THE INVENTION

Field of the Invention

The present invention relates generally to systems and methods for automatically inspecting the quality of newly-manufactured containers, and more particularly to an improved system and method for detecting whether or not containers are out-of-round by more than a predetermined amount.

Glass containers are made in a manufacturing process that has three parts, namely the batch house, the hot end, and the cold end. The batch house is where the raw materials for glass (which cullet (crushed, recycled glass), sand, soda ash, limestone, and other raw materials) are prepared and mixed into batches. The hot end begins with a furnace, in which the batched materials are melted into molten glass, and from which a stream of molten glass flows.

The molten glass is cut into cylinders of glass called gobs, which fall by gravity into blank molds. In the blank molds, a pre-container referred to as a parison is formed, either by using a metal plunger to push the glass into the blank mold, or by blowing the glass from below into the blank mold. The parison is inverted and transferred to a mold, where the parison is blown out into the shape of the container. Typically, the manufacturing process is performed in an Individual Section or IS forming machine, which contains between five and sixteen identical sections, each of which is capable of making one, two, three, or four containers simultaneously.

The hot end also includes an annealing process which prevents the containers from having weakened glass caused by stresses caused by uneven cooling. The annealing process is used to achieve even cooling, using an annealing oven or Lehr to heat the containers, and then slowly cool them over a twenty to sixty minute period. If the containers are to be used for certain uses such as containing alcoholic spirits, an internal treatment or dealkalization is performed prior to annealing to render the container more resistant to alkali extraction.

The role of the cold end of the glass container manufacturing process is inspection of the containers to ensure that they are of acceptable quality. All glass containers are inspected by automated machines after manufacturing for a variety of faults, typically including small cracks in the glass referred to as checks, foreign inclusions referred to as stones, bubbles in the glass referred to as blisters, and excessively thin walls. An example of one such inspection is taught in U.S. Pat. No. 6,031,221, to Furnas, which patent is assigned to the assignee of the present patent application, and which patent is hereby incorporated herein by reference in its entirety. In addition, inspectors carry out a number of checks manually on samples of the containers, which commonly include visual and dimensional checks.

While the inspections carried out at the cold end have unequivocally resulted in higher quality containers, one particular problem has continued to elude detection—containers that are out-of-round by more than an acceptable amount. The problems associated with out-of-round containers is especially evident following the application of a paper label to an excessively out-of-round container, and results in a product having poor appearance. If a container is severely out-of-round, the condition can result in handling problems while transporting the container as well as problems at the filling stations that can be disruptive to production.

A number of development efforts have been undertaken to develop mechanisms to detect out-of-round container, but these attempts have resulted in unreliable and/or unfeasible systems for field application in container manufacturing facilities. These development efforts have traditionally utilized a number of metal fingers that are each linked to a linear variable differential transducer (LVDT) to measure and determine the degree of out-of-roundness of a container. Due to the mechanical nature of this design, the fingers had to contact the container light enough so as not to affect the handling or coating, but yet be sufficiently strong and durable to withstand the harsh environments of a container manufacturing plant.

It is accordingly the primary objective of the present invention that it provide a system and method for inspecting containers in order to determine whether or not they are out-of-round by more than a predetermined amount. It is another objective of the present invention that the making of such a determination be performed without physically contacting the containers, and that the determination be made both quickly and with a high degree of accuracy. It is a further objective of the present invention that it be capable of implementation in a large scale container production facility.

It is another objective of the present invention that it be adaptable to different types of containers that may be manufactured at different times in a container production facility. It is a related objective of the present invention that it be adjustable in tolerance to accommodate the inspection of different types of containers that have tighter or less stringent roundness requirements. It is a still further objective of the present invention that it be capable of evaluating the roundness of different elements of containers.

The out-of-round detection system of the present invention must also be of construction which is both durable and long lasting, and it should also require little or no maintenance to be provided by the user throughout its operating lifetime. In order to enhance the market appeal of the out-of-round detection system of the present invention, it should also be of inexpensive construction to thereby afford it the broadest possible market. Finally, it is also an objective that all of the aforesaid advantages and objectives of the out-of-round detection system of the present invention be achieved without incurring any substantial relative disadvantage.

SUMMARY OF THE INVENTION

The disadvantages and limitations of the background art discussed above are overcome by the present invention. With this invention, containers that are out-of-round by more than a predetermined amount can be detected and discarded. In its simplest terms, one or more ultrasonic sensors are located at fixed positions with reference to a container that is being checked. The container is rotated at least one full revolution (one and one-half revolutions in a preferred embodiment) while the ultrasonic sensors are directed at one or more locations on the container.

By using the sensor(s), the distance between the sensor(s) and the container can be evaluated continuously as the container is rotated. If the distance between the sensor and the container varies more than a predetermined amount, the container is determined to be unacceptable, and it may be discarded. The nominal distance to a container at the location at which it will be rotated is known, and a tolerance for an acceptable deviation from perfect roundness may be established. This establishes both a minimum distance between the sensor and a container and a maximum distance between the sensor and a container.

If the measured distance between the sensor and a container being evaluated as it is rotated either falls below this determined minimum distance and/or exceeds this determined maximum distance as the container is being rotated, the container has failed the out-of-roundness test and will be discarded. The sensor may either be a simple ultrasonic sensor that requires a system to operate it, or, preferably, it may be a self-contained ultrasonic proximity sensor that provides a first digital output when the distance between the sensor and a container falls within the desired range and a second digital output when the distance between the sensor and a container is either less than the determined minimum distance or greater than the determined maximum distance.

The orientation of the sensor with respect to the container being evaluated is an orthogonal orientation; any other orientation will result in the sensor not operating properly. The sensor is oriented toward a particular location on the container where it is important to have roundness within tolerances, such as, for example, the body of the container upon which a label may be placed. The sensor can, however, instead be directed at other locations on the container, such as, for example, the shoulder of the container, which is a location at which it is common to place molded-in logos.

While a single sensor can be used in the out-of-round detection system of the present invention, it is also possible to use multiple sensors. For example, two or three sensors may each be directed at a different portion of the body of a container (the top, middle, and bottom of the body of the container). In addition to one or more sensors directed at the body of a container, an additional sensor may be directed at the shoulder, or some other element, of the container.

If multiple sensors are used, the system is operated in a manner whereby an unacceptable signal from any of the sensors will be sufficient to reject the container being evaluated. The out-of-round detection system of the present invention is used to remove defective containers from the production line, with rejected containers typically being crushed and recycled. The out-of-round detection system of the present invention may also be used in conjunction with other inspections (such as optical inspections) being performed, with containers failing either the out-of-round test of the present invention or any other test(s) being rejected.

It may therefore be seen that the present invention teaches a system and method for inspecting containers in order to determine whether or not they are out-of-round by more than a predetermined amount. The out-of-round detection system of the present invention is capable of making such a determination without physically contacting the containers, and the determination is made both quickly and with a high degree of accuracy. The out-of-round detection system of the present invention is also capable of implementation in a large scale container production facility.

The out-of-round detection system of the present invention is adaptable to different types of containers that may be manufactured at different times in a container production facility. The out-of-round detection system of the present invention is adjustable in tolerance to accommodate the inspection of different types of containers that have tighter or less stringent roundness requirements. The out-of-round detection system of the present invention is also capable of evaluating the roundness of different elements of containers.

The out-of-round detection system of the present invention is of a construction which is both durable and long lasting, and which will require little or no maintenance to be provided by the user throughout its operating lifetime. The out-of-round detection system of the present invention is also of inexpensive construction to enhance its market appeal and to thereby afford it the broadest possible market. Finally, all of the aforesaid advantages and objectives of the out-of-round detection system of the present invention are achieved without incurring any substantial relative disadvantage.

DESCRIPTION OF THE DRAWINGS

These and other advantages of the present invention are best understood with reference to the drawings, in which:

FIG. 6 is a flow diagram describing the operation of the out-of-round detection system of the present invention.

DETAILED DESCRIPTION OF THE EXEMPLARY EMBODIMENTS

An exemplary embodiment of the present invention may be used with containers including, but not limited to glass bottles. Prior to discussing the construction and operation of the out-of-round detection system of the present invention, it is helpful to discuss the construction and elements of a typical container such as the container 20 that is shown in FIG. 1.

Figure 1:
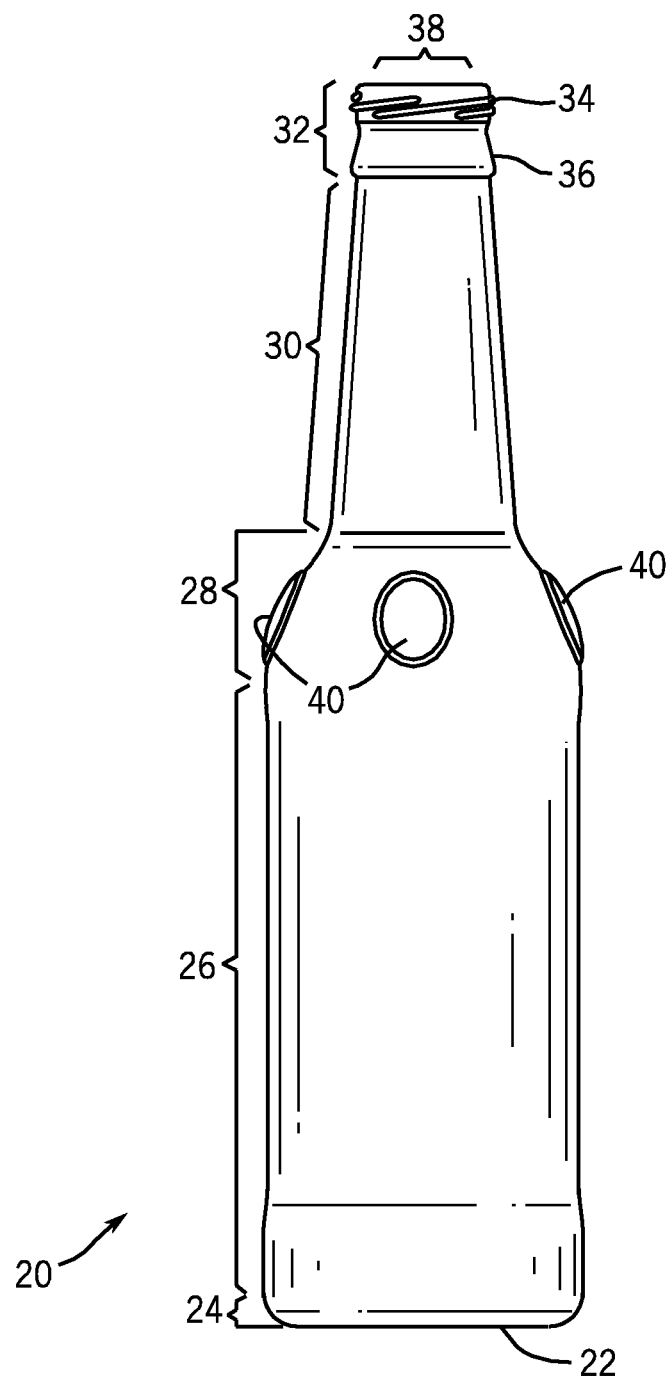
FIG. 1 is a side plan view of a container showing the various elements of the container several of which are relevant to the out-of-round detection system of the present invention.

The container 20 illustrated in FIG. 1 is a glass beverage bottle, and the elements of its construction will be referred to from the bottom to the top. The bottom of the container 20 is referred to as the base 22 of the container 20, and the rounded portion where the horizontal plane of the base 22 transitions into a vertical cylinder is referred to as the heel 24 (and is also known as the insweep) of the container 20. The main content containing portion of the container 20, which is located above the heel 24, is the body 26 of the container 20. The body 26 of the container 20, which is essentially cylindrical in configuration, is also referred to as the label panel, since it is the body 26 upon which a label (not shown herein) will typically be placed.

Located above the body 26 is the portion of the container 20 that curves inwardly to a reduced diameter, which is referred to as the shoulder 28 of the container 20. The shoulder 28 is the transition between the body 26 of the container 20 and the neck 30 of the container 20, and the neck 30 lies above the shoulder 28 and typically tapers inwardly toward the top of the container 20. As such, the neck 30 of the container 20 is typically at least somewhat constricted as compared to the body 26 of the container 20.

The portion of the container 20 that is located above the neck 30 of the container 20 is referred to as the finish 32 of the container 20. The finish 32 of the container 20 illustrated in FIG. 1 has two subcomponents. The uppermost of these two subcomponents of the finish 32 is referred to as the lip 34 (and is also known as the rim), and is located at the top of the container 20. It may be seen that the lip 34 on the container 20 shown in FIG. 1 is threaded, although other containers may have closure arrangements differing from that of the container 20 shown in FIG. 1. The lowermost subcomponent of the finish 32 is referred to as the collar 36 (and is also known as the string rim), and the collar 36 on the container 20 may be seen to be somewhat outwardly projecting.

Located at the top of the finish 32 is the bore 38 (also known as the throat), which is the opening in the container 20 from which the contents of the container 20 will be accessed. The container 20 also has several raised embossed logos 40 located on the shoulder 28 of the container 20 that are evenly distributed around the circumference of the shoulder 28.

Figure 2:
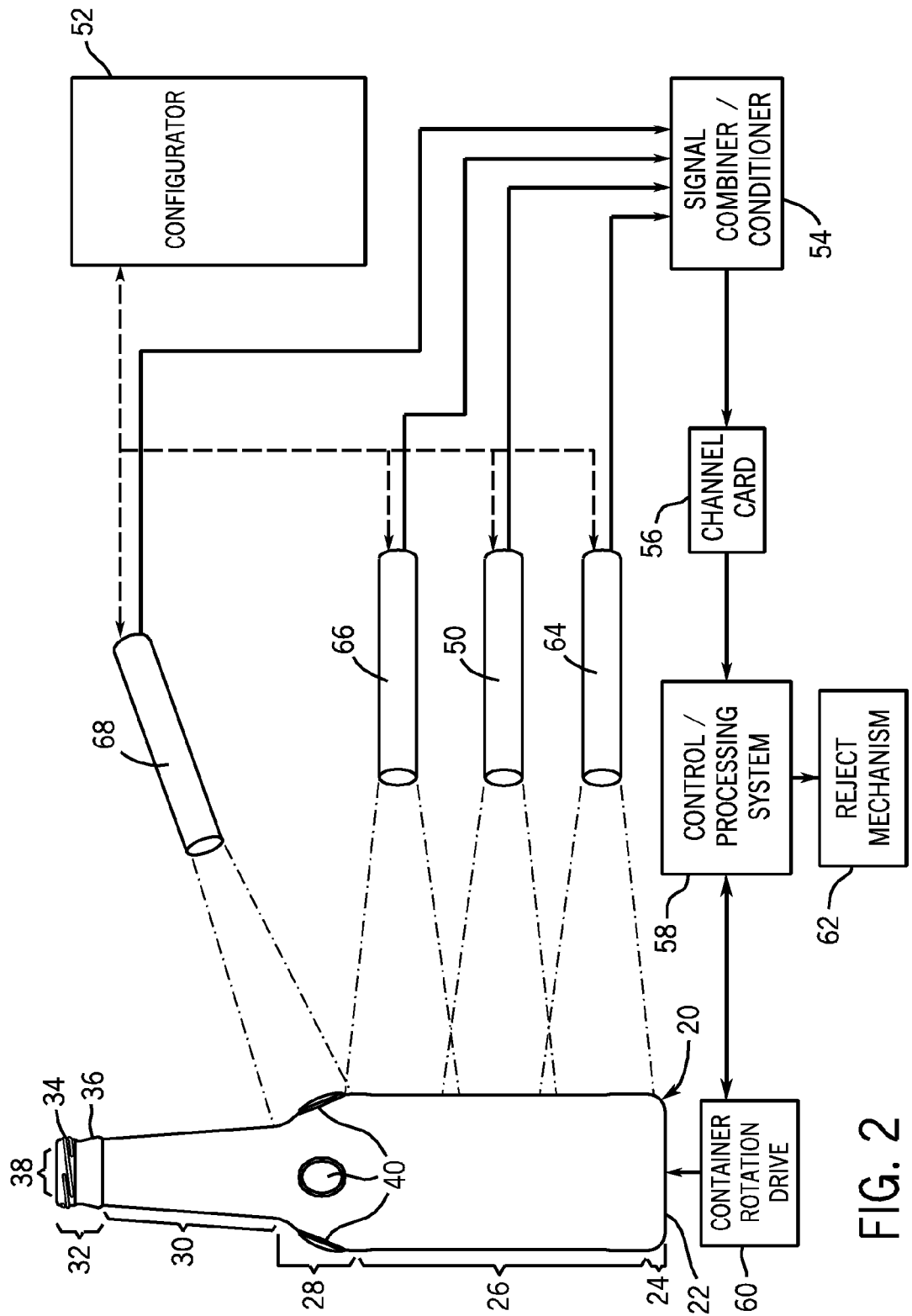
FIG. 2 is a functional schematic showing the various components of the out-of-round detection system of the present invention.

Referring next to FIG. 2, an exemplary out-of-round detection system constructed according to the teachings of the present invention is illustrated as a functional schematic that shows the various components of the exemplary out-of-round detection system. In conjunction with FIG. 2, four different exemplary systems will be discussed, respectively having one, two, three, or four sensors. The sensors used by the out-of-round detection system of the present invention are ultrasonic proximity sensors that are capable of sensing the distance from the sensor to an object with a high degree of accuracy and processing that information to provide a continuous digital output indicative of whether or not the distance detected is within a programmed range. One such sensor is the Model SC650A-B00 ultrasonic proximity sensor from Hyde Park Electronics LLC, of Dayton, Ohio. (Those skilled in the art will appreciate that the proximity sensor and the processing function could instead be located in two discreet devices.)

The Model SC650A-B00 ultrasonic proximity sensor is a self-contained ultrasonic proximity sensor that is software configurable using a configurator interface module such as the Model AC441A configurator interface module, also available from Hyde Park Electronics LLC. The configurator interface module is used to program a desired distance range into the ultrasonic proximity sensor(s). When the out-of-round detection system of the present invention is operating, the container 20 being checked will be a nominal distance X away from the ultrasonic proximity sensor(s).

By selecting a tolerance Y from perfect roundness of the container 20, a range of distances between the ultrasonic proximity sensor(s) and the container 20 that is between X−Y and X+Y may be established. In operation, the ultrasonic proximity sensor(s) will produce a first output (high or low) when the distance between the ultrasonic proximity sensor(s) and the container 20 is between X−Y and X+Y, and a different second output (low or high) when the distance between the ultrasonic proximity sensor(s) and the container 20 is either less than X−Y or more than X+Y. By rotating the container 20 while operating the ultrasonic proximity sensor(s), it can thereby be determined whether the container 20 is within the established out-of-round tolerance, in which case the first output will be continuously produced, or outside of the established out-of-round tolerance, in which case the second output will occur during at least a portion of the rotation of the container 20, indicating that the container 20 is unacceptable from a quality standpoint.

The software configurable ultrasonic proximity sensor may also have a hysteresis function programmed thereinto. The purpose of using such a function is to allow the out-of-round detection system of the present invention to avoid making a false rejection of a container due to a normal container characteristic such as container seams that are located at the position at which the mold halves met each other. This is accomplished by requiring that any occurrence of a sensed distance between the ultrasonic proximity sensor and the container that is either less than X−Y or more than X+Y occur for a sufficient duration (which may be either a rotational duration or a time duration) to ensure that it is an out-of-round container that is being detected rather than merely the detection of the presence of a seam or other normal container characteristic.

In the first example to be discussed in conjunction with FIG. 2, a first sensor 50 is positioned the nominal distance X away from the position at which the container 20 to be checked will be located. Note that the first sensor 50 of the preferred embodiment includes both a sensor and a processor, which could instead be in two separate elements. The first sensor 50 is oriented orthogonally with respect to the axis of the container 20. The first sensor 50 will be used to check the roundness of the body 26 of the container 20. The operational parameters of the first sensor 50 are set using a configurator interface module 52, which, as indicated by the dotted line between the configurator interface module 52 and the first sensor 50, need only be connected to the first sensor 50 when the operational parameters of the first sensor 50 are initially being set or are being changed for a different size container.

The output of the first sensor 50 is supplied to a signal combiner/conditioner 54, which, in the case of the first example, functions only as a signal conditioner since only the input from the first sensor 50 is supplied to it. The output of the signal combiner/conditioner 54 is supplied through a channel card 56 to a control/processing system 58. The channel card 56 is one of a plurality of inputs to the control/processing system 58, the others of which are not shown herein.

The control/processing system 58 operates a container rotation drive 60 that is used to selectively rotate the container 20. It will be appreciated by those skilled in the art that a container is moved into a position for the out-of-round detection system of the present invention to check its roundness. The container rotation drive 60 then rotates the container 20, typically approximately one and one-half rotations in order to ensure that the roundness of the entire container 20 is checked.

As the container 20 is rotated by the container rotation drive 60, the first sensor 50 will continuously monitor the distance between the container 20 and the first sensor 50, and will provide its output signal to the signal combiner/conditioner 54, which provides an output through the channel card 56 to the control/processing system 58. If the output of the first sensor 50 at any point during the rotation of the container 20 produces the second output indicating that the distance between the first sensor 50 and the container 20 is either less than X−Y or more than X+Y, the control/processing system 58 will initiate the operation of a reject mechanism 62 that will cause the container 20 to be rejected (and, typically, recycled).

It will be understood by those skilled in the art that the control/processing system 58 includes data correlation and container tracking capabilities, which enable a rejected container to be removed from the stream of containers that pass the roundness check at a point downstream of the out-of-round detection system of the present invention. It will also be understood that the control/processing system 58 may also have inputs from other types of sensors that may be used to monitor other quality standards, such as, for example, the optical inspection taught in the above-incorporated by reference U.S. Pat. No. 6,031,221, to Furnas. Should a container fail any one or more of the inspections being carried out upon it, it will be rejected. The operation of the reject mechanism 62 is also of conventional design in the art, and will therefore not be described in detail herein.

In a second example illustrated in FIG. 2, a second sensor 64 as well as the first sensor 50 is positioned the nominal distance X away from the position at which the container 20 to be checked will be located. Note that both the first sensor 50 and the second sensor 64 of the preferred embodiment each include both a sensor and a processor, which could instead be in two separate elements. The second sensor 64 and the first sensor 50 are respectively located such that they will scan different portions of the body 26 of the container 20. The first sensor 50 and the second sensor 64 are oriented orthogonally with respect to the axis of the container 20. Although the second sensor 64 and the first sensor 50 are shown respectively scanning the bottom portion and the intermediate portion of the body 26 of the container 20, if only these two sensors are used, they will likely be positioned to respectively scan the lower portion and the upper portion of the body 26 of the container 20. In this case, both the second sensor 64 and the first sensor 50 will be used to check the roundness of the body 26 of the container 20.

The operational parameters of the second sensor 64 are also set using the configurator interface module 52, which, as indicated by the dotted line between the configurator interface module 52 and the second sensor 64, need only be connected to the second sensor 64 when the operational parameters of the second sensor 64 are initially being set or are being changed for a different size container. The outputs of the first sensor 50 and the second sensor 64 are supplied to the signal combiner/conditioner 54, will provide an output indicating a defect whenever either one (or both) of the first sensor 50 and the second sensor 64 produces the second output indicating that the distance between the sensor in question and the container 20 is either less than X−Y or more than X+Y, thereby causing the control/processing system 58 to initiate the operation of the reject mechanism 62 to cause the container 20 to be rejected.

In a third example illustrated in FIG. 2, a third sensor 66 as well as the first sensor 50 and the second sensor 64 is positioned the nominal distance X away from the position at which the container 20 to be checked will be located. Note that the first sensor 50, the second sensor 64, and the third sensor 66 and of the preferred embodiment each include both a sensor and a processor, which could instead be in two separate elements. The first sensor 50, the second sensor 64, and the third sensor 66 are respectively located such that they will scan different portions of the body 26 of the container 20. The first sensor 50, the second sensor 64, and the third sensor 66 are oriented orthogonally with respect to the axis of the container 20. Although the first sensor 50, the second sensor 64, and the third sensor 66 will respectively scan the intermediate portion, the bottom portion, and the top portion of the body 26 of the container 20. In this case, all three of the first sensor 50, the second sensor 64, and the third sensor 66 will be used to check the roundness of the body 26 of the container 20.

The operational parameters of the third sensor 66 are also set using the configurator interface module 52, which, as indicated by the dotted line between the configurator interface module 52 and the third sensor 66, need only be connected to the third sensor 66 when the operational parameters of the third sensor 66 are initially being set or are being changed for a different size container. The outputs of the first sensor 50, the second sensor 64, and the third sensor 66 are supplied to the signal combiner/conditioner 54, will provide an output indicating a defect whenever any one (or more) of the first sensor 50, the second sensor 64, and the third sensor 66 produces the second output indicating that the distance between the sensor in question and the container 20 is either less than X−Y or more than X+Y, thereby causing the control/processing system 58 to initiate the operation of the reject mechanism 62 to cause the container 20 to be rejected.

In a fourth example illustrated in FIG. 2, a fourth sensor 68 is positioned the nominal distance X away from the shoulder 28 of the container 20 to be checked will be located. Note that the first sensor 50, the second sensor 64, the third sensor 66, and the fourth sensor 68 of the preferred embodiment each include both a sensor and a processor, which could instead be in two separate elements. It should be noted that the fourth sensor 68 is positioned as orthogonally to the surface of the container 20 at the shoulder 28 (and the location of the raised embossed logos 40 on the shoulder 28) as is possible. Thus, while the axis of the fourth sensor 68 will intersect the axis of the container 20, it will do so at an angle rather than orthogonally. It should be noted that the fourth sensor 68 can be used in conjunction with any one, two, or all three of the first sensor 50, the second sensor 64, and the third sensor 66.

The operational parameters of the fourth sensor 68 are also set using the configurator interface module 52, which, as indicated by the dotted line between the configurator interface module 52 and the fourth sensor 68, need only be connected to the fourth sensor 68 when the operational parameters of the fourth sensor 68 are initially being set or are being changed for a different size container. The outputs of the first sensor 50, the second sensor 64 (if used), the third sensor 66 (if used), and the fourth sensor 68 are supplied to the signal combiner/conditioner 54, will provide an output indicating a defect whenever any one (or more) of the first sensor 50, the second sensor 64 (if used), the third sensor 66 (if used), and the fourth sensor 68 produces the second output indicating that the distance between the sensor in question and the container 20 is either less than X−Y or more than X+Y, thereby causing the control/processing system 58 to initiate the operation of the reject mechanism 62 to cause the container 20 to be rejected.

Figure 3:
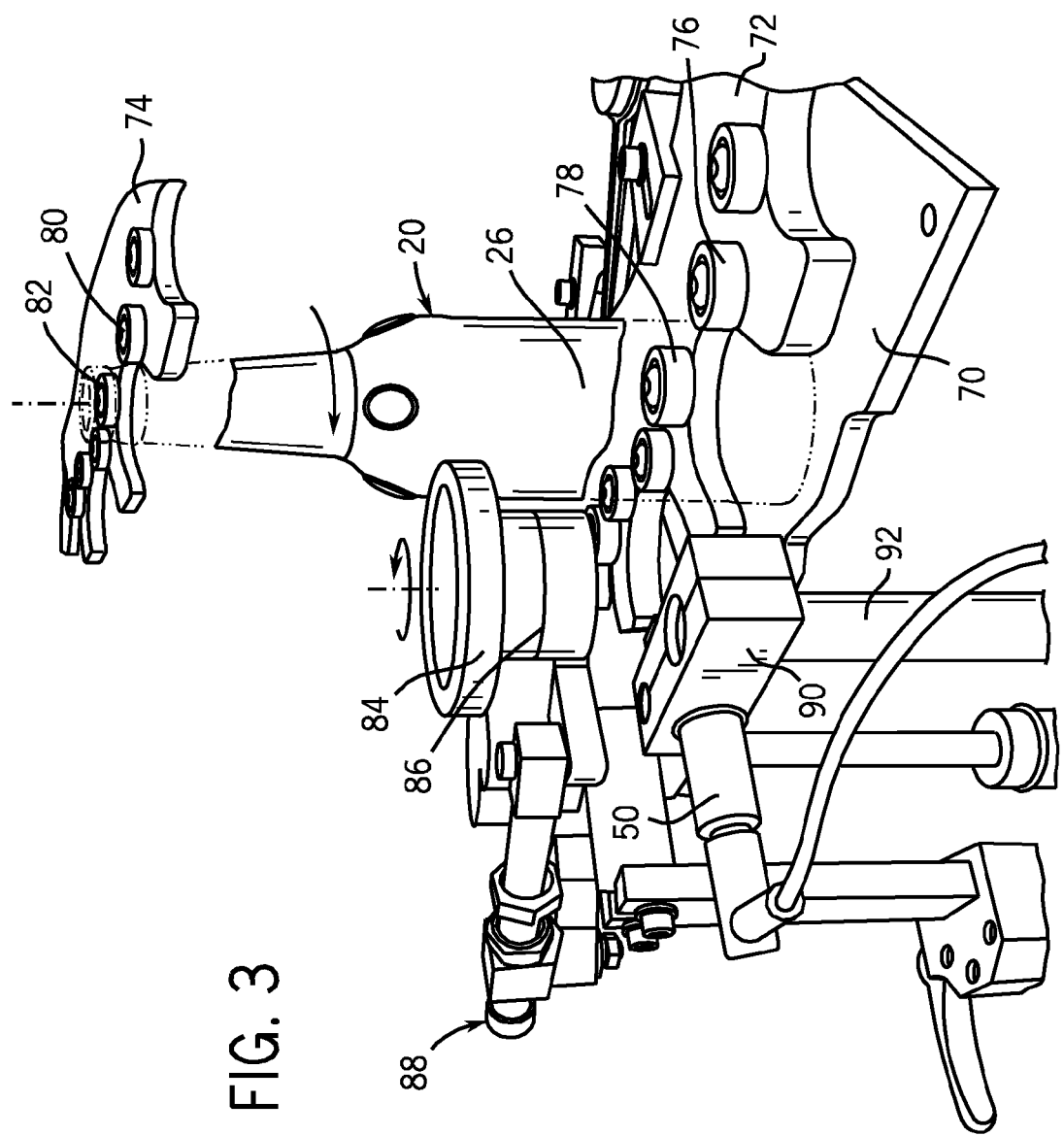
FIG. 3 is an isometric view of a portion of a first type of an inspection station of a container manufacturing system having the sensor of the out-of-round detection system of the present invention installed therein, also showing a first type of container rotation drive for rotating containers.

Referring next to FIG. 3, part of a first type of an inspection station used in a container manufacturing system and having a first type of container rotation drive for rotating containers is illustrated. A container 20 is shown to be resting on a deadplate 70 and is engaged by a starwheel 72 near the bottom of the container 20 and by a second starwheel 74 near the top of the container. Two rollers 76 and 78 are located on the starwheel 72, and the container 20 is engaged near its bottom by these rollers 76 and 78. Two additional rollers 80 and 82 are located on the starwheel 74, and the container 20 is engaged near its top by these rollers 80 and 82. It will be appreciated by those skilled in the art that the starwheels 72 and 74 both rotate to bring the container 20 into position in the inspection station for the out-of-round check.

A drive roller 84 contacts the container 20 on the side opposite its support by the rollers 76 and 78 on the starwheel 72 and the rollers 80 and the roller 82 on the starwheel 74. The drive roller 84 is driven by a drive mechanism 86 which is supported by support apparatus indicated generally by the reference numeral 88. The first sensor 50 is mounted on a sensor clamp 90, which is supported in its fixed position by a support apparatus 92. The first sensor 50 is oriented toward the midpoint of the body 26 of the container 20, and is located orthogonal to the surface of the body 26 of the container 20.

It will be appreciated by those skilled in the art that the drive roller 84 will cause the container 20 to rotate between the drive roller 84 and the rollers 76 and 78 (at the bottom of the container 20) and the rollers 80 and 82 (at the top of the container 20). When the container 20 is rotating, the distance between the body 26 of the container 20 and the first sensor 50 will be detected by the first sensor 50, and from this it may be determined whether or not the container 20 is out-of-round by more than a predetermined amount. It should be noted that the construction and operation of the apparatus to rotate the container 20 in FIG. 3 is of conventional design, and that it may be used with another type of sensor (not shown herein) located at the same inspection station if desired.

Figure 4:
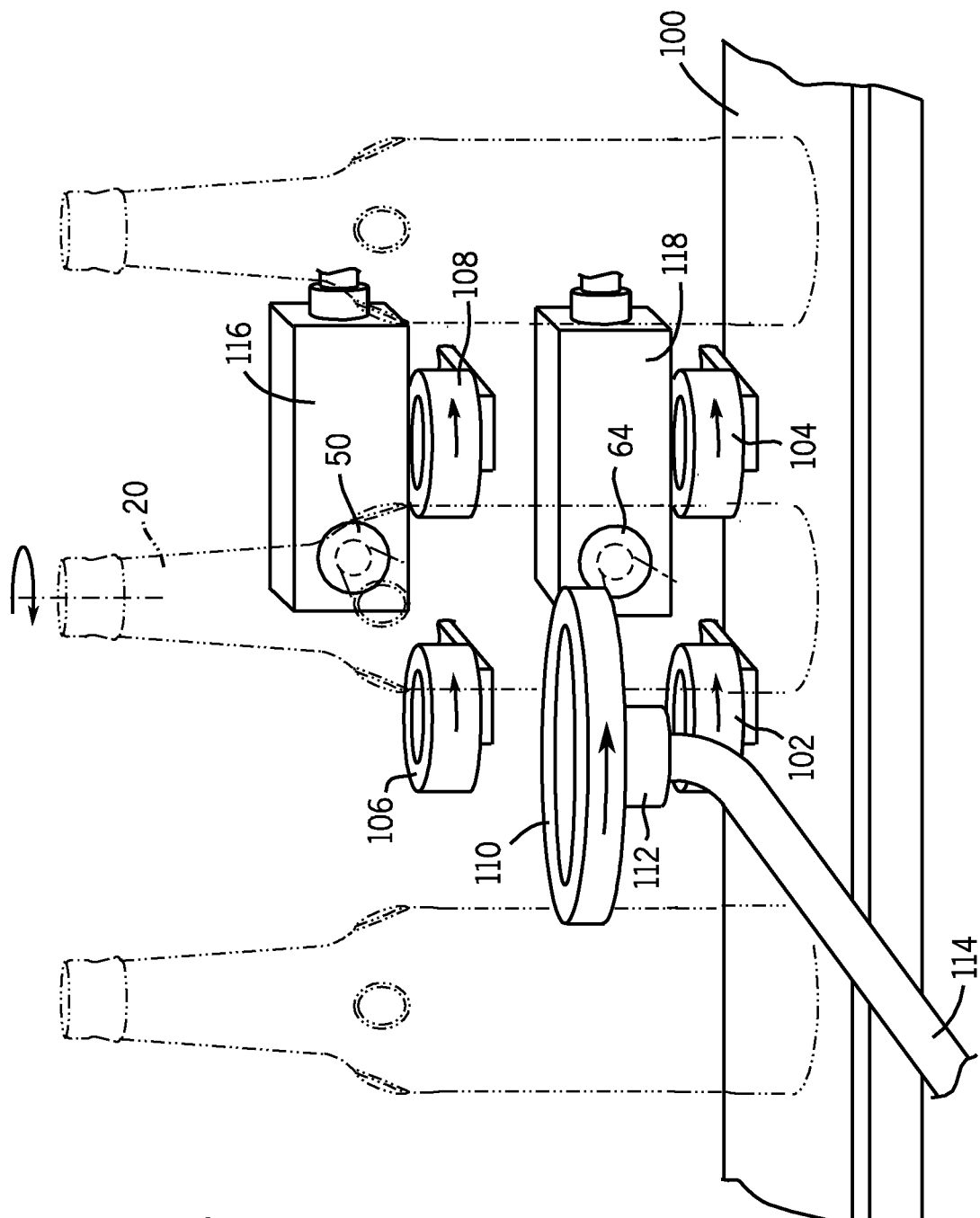
FIG. 4 is an isometric view of a portion of a second type of an inspection station of a container manufacturing system having two sensors of the out-of-round detection system of the present invention installed therein, also showing a second type of container rotation drive for rotating containers.

Referring now to FIG. 4, part of a second type of an inspection station used in a container manufacturing system and having a second type of container rotation drive for rotating containers is illustrated. A container 20 is shown to be resting on a conveyer 100 at the location of an inspection station. The container 20 is engaged by two rollers 102 and 104 on the far side as shown in FIG. 4 and near its bottom. Two additional rollers 106 and 108 engage the container 20 near its top on the far side as shown in FIG. 4 and near its bottom.

A drive roller 110 contacts the container 20 on the side opposite its support by the rollers 102 and 104 at the bottom and the rollers 106 and the roller 108 at the top (its front side as shown in FIG. 4). The drive roller 110 is driven by a drive mechanism 112 which is supported by support apparatus indicated generally by the reference numeral 114. The first sensor 50 and the second sensor 64 are integrally mounted in sensor mounting boxes 116 and 118, which are supported adjacent to the back of the conveyer 100 as shown in FIG. 4. This configuration of the first sensor 50 and the sensor mounting box 116, and the second sensor 64 and the sensor mounting box 118, is a commercially available one-piece flat pack sensor assembly from Hyde Park Electronics LLC. The first sensor 50 is oriented toward the upper portion of the body 26 of the container 20, and the second sensor 64 is oriented toward the lower portion of the body 26 of the container 20. Both the first sensor 50 and the second sensor 64 are located orthogonal to the surface of the body 26 of the container 20.

It will be appreciated by those skilled in the art that the drive roller 110 will cause the container 20 to rotate between the drive roller 110 and the rollers 102 and 104 (at the bottom of the container 20) and the rollers 106 and 108 (at the top of the container 20). When the container 20 is rotating, the distance between the upper portion of the body 26 of the container 20 and the first sensor 50 will be detected by the first sensor 50, the distance between the lower portion of the body 26 of the container 20 and the second sensor 64 will be detected by the second sensor 64, and from this it may be determined whether or not the container 20 is out-of-round by more than a predetermined amount. It should be noted that the construction and operation of the apparatus to rotate the container 20 in FIG. 4 is also of conventional design, and that it may be used with another type of sensor (not shown herein) located at the same inspection station if desired.

Figure 5:
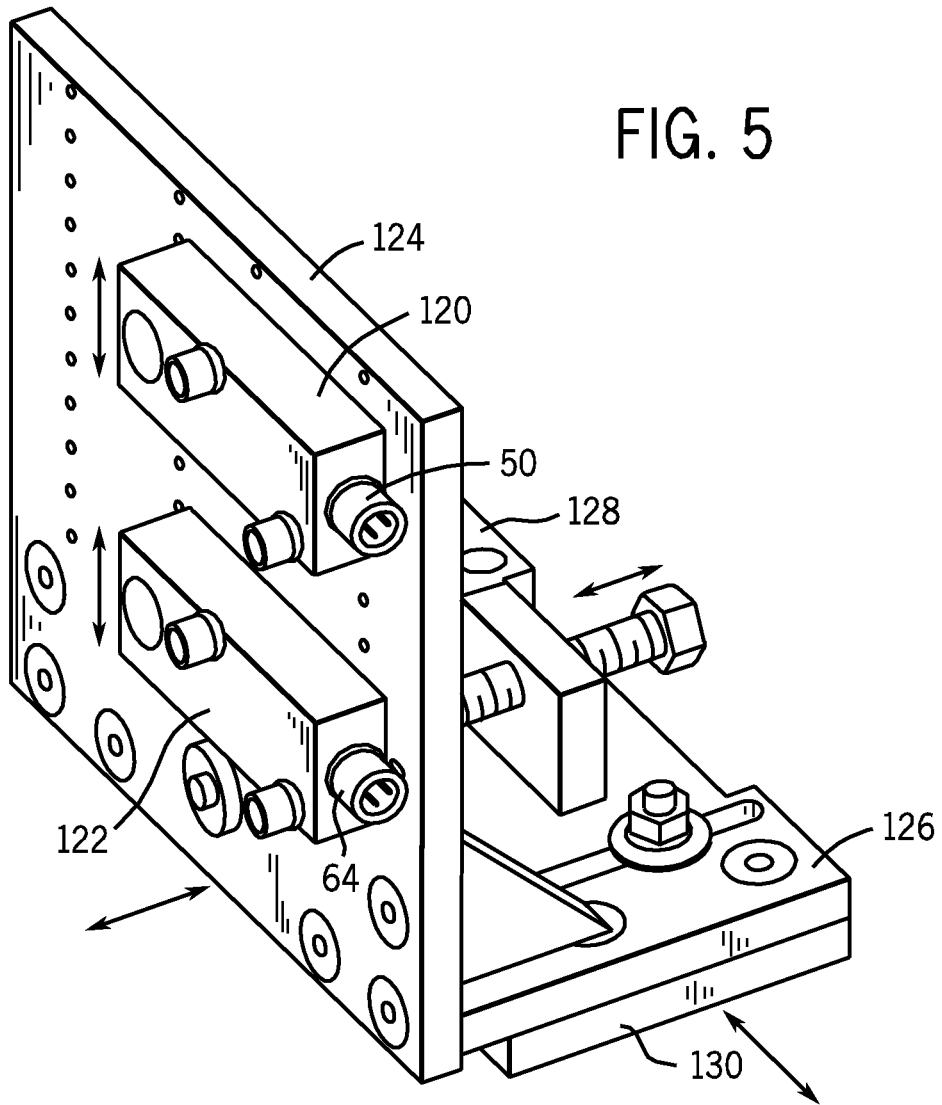
FIG. 5 is an isometric view of a panel having two sensors mounted thereupon, the panel being adjustable in position to facilitate use of the sensors with different types of containers.

Referring next to FIG. 5, an alternative mounting system for the first sensor 50 and the second sensor 64 is illustrated. The objective of this mounting system is to allow adjustment of the position of the first sensor 50 and the second sensor 64. The first sensor 50 is mounted in a first sensor mounting box 120, and the second sensor 64 is mounted in a second sensor mounting box 122. The first sensor mounting box 120 and the second sensor mounting box 122 are mounted on a panel 124 having foot members 126 and 128.

The foot members 126 and 128 are mounted on a base member 130 in a manner allowing lateral adjustment of the panel 124 as well as the first sensor 50 and the second sensor 64. The panel 124 itself has multiple mount positions for the first sensor 50 and the second sensor 64 to allow vertical position adjustment, and placement of the base member 130 relative to the position at which a container 20 will be located allows an adjustment of the distance between the first sensor 50 and the second sensor 64 and the container 20 to be checked. Such adjustments are shown schematically in FIG. 5.

Referring finally to FIG. 6, the method of operation of the out-of-round detection system of the present invention is described. The process begins with a process initiation step 140. At this time, a container 20 (shown in FIGS. 1 through 4) is brought into position for testing by the out-of-round detection system of the present invention in an inspection station (such as the ones shown in FIGS. 3 and 4) in a move next container to test position step 142. Next, the container 20 is engaged by the rotation mechanism at the testing station (such as the rotation mechanisms shown in FIGS. 3 and 4) in an engage container with rotation mechanism step 144.

Following this step, the container 20 is rotated by the rotation mechanism in a spin container step 146. As mentioned above, the container 20 is typically rotated approximately one and one-half rotations in order to ensure that the roundness of the entire container 20 is checked. As the container 20 is rotated, the proximity sensor(s) (which may be any one or more of the first sensor 50, the second sensor 64, the third sensor 66, and the fourth sensor 68) is (are) operated to continuously monitor the distance between the sensor(s) and the container 20 in an operate sensor(s) to detect bottle surface position step 148.

As the sensor(s) monitor the distance between the sensor(s) and the container 20, the sensor(s) continuously provide an output indicating whether the distance between the proximity sensor(s) and the container 20 is within the desired tolerance or outside the desired tolerance in a provide output from sensor(s) step 150. Next, if more than one sensor is used, the signals from the sensors will be combined and conditioned in a combine/condition signal(s) from sensor(s) step 152 (which is performed by the signal combiner/conditioner 54 shown in FIG. 2). In this step, if there is more than one sensor used, if any of the sensors indicate that the container 20 is outside the desired tolerance, the output of the combine/condition signal(s) from sensor(s) step 152 will indicate that the container 20 is outside the desired tolerance. If, on the other hand, only a single sensor is used, the output of that sensor will be the output of the combine/condition signal(s) from sensor(s) step 152, and only signal conditioning will be provided therein.

The combined signal from the sensor(s) is monitored in a monitor combined signal from sensor(s) step 154 (which is performed by the channel card 56 and the control/processing system 58 shown in FIG. 2). The control/processing system 58 will also make a determination as to whether the container is good based upon the combined signal in an is the container good determination step 156. If it is determined that the container 20 is good, the container 20 is allowed to move to finished goods in a move container to finished product location step 158, with the process then terminating in a process termination step 160. If, on the other hand, it is determined in the is the container good determination step 156 that the container 20 is out-of-round and thus is defective, the container 20 is discarded in a remove container from production line to recycle step 162, with the process then moving to the process termination step 160.

It may therefore be appreciated from the above detailed description of the exemplary embodiments of the present invention that it teaches a system and method for inspecting containers in order to determine whether or not they are out-of-round by more than a predetermined amount. The out-of-round detection system of the present invention is capable of making such a determination without physically contacting the containers, and the determination is made both quickly and with a high degree of accuracy. The out-of-round detection system of the present invention is also capable of implementation in a large scale container production facility.

The out-of-round detection system of the present invention is adaptable to different types of containers that may be manufactured at different times in a container production facility. The out-of-round detection system of the present invention is adjustable in tolerance to accommodate the inspection of different types of containers that have tighter or less stringent roundness requirements. The out-of-round detection system of the present invention is also capable of evaluating the roundness of different elements of containers.

The out-of-round detection system of the present invention is of a construction which is both durable and long lasting, and which will require little or no maintenance to be provided by the user throughout its operating lifetime. The out-of-round detection system of the present invention is also of inexpensive construction to enhance its market appeal and to thereby afford it the broadest possible market. Finally, all of the aforesaid advantages and objectives of the out-of-round detection system of the present invention are achieved without incurring any substantial relative disadvantage.

Although the foregoing description of the out-of-round detection system of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the out-of-round detection system of the present invention as described herein may be made, none of which depart from the spirit or scope of the present invention. The particular embodiments and applications were chosen and described to provide the best illustration of the principles of the out-of-round detection system of the present invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A system for automatically inspecting the roundness of containers, comprising:
    an apparatus for rotating a single container about an axis of the container, the single container being inspected at an inspection station, wherein the container has a shoulder located between a body of the container and a neck of the container;
    a first ultrasonic proximity sensor positioned at a fixed location with respect to said inspection station for sensing the distance between said first proximity sensor and the container being inspected at the inspection station while the container is rotated;
        said first ultrasonic proximity sensor being oriented orthogonally with respect to the axis of the container and oriented toward one of the shoulder of the container, the body of the container, and at least one raised embossed logo of the container; and
    a first programmable processor configured to process the distance sensed by said first proximity sensor and provides a first output signal that is indicative of whether or not the distance sensed by said first proximity sensor is within a first predetermined range of distances programmed in the first processor for a container type being inspected; wherein the single container being inspected at the inspection station is located a nominal distance X from said first proximity sensor, and wherein a preset tolerance Y from perfect roundness is desired and acceptable for the container type is programmed in the first processor, and wherein said first predetermined range of distances comprises:
        the range of distances between X−Y and X+Y;
    the first processor provides a first output signal when the distance between said first proximity sensor and the container is between X−Y and X+Y, and a different second output signal when the distance between said first proximity sensor and the container is either less than X−Y or more than X+Y; wherein said first processor has a hysteresis function whereby any occurrence of a sensed distance between said first proximity sensor and the single container being inspected that is either less than X−Y or more than X+Y must occur for a minimum duration of container rotation before said second output signal is provided by said first processor.

2. A system as defined in claim 1, wherein said apparatus for rotating a container is operated to rotate a container at least one revolution while said first proximity sensor is sensing the distance between said sensor and the container being inspected.

3. A system as defined in claim 2, wherein said apparatus for rotating a container is operated to rotate a container approximately one and one-half revolutions while said first proximity sensor is sensing the distance between said sensor and the container being inspected.

4. A system as defined in claim 1, wherein said apparatus for rotating the container comprises:
    two pair of spaced-apart rollers for externally engaging the container; and a drive roller for engaging and rotating the container while holding the container against said two pair of spaced-apart rollers, thereby defining an average axis of rotation as a function of the geometry of the container and the spacing between said two pair of spaced-apart rollers and said drive roller.

5. A system as defined in claim 1, wherein said first proximity sensor is located orthogonally with respect to a surface of the container toward which said first proximity sensor is oriented.

6. A system as defined in claim 1, wherein the position of said first proximity sensor is adjustable to accommodate containers of different physical sizes and/or configurations.

7. A system as defined in claim 1, wherein said first proximity sensor and said first processor are integrated into a single device.

8. A system as defined in claim 1, additionally comprising:
    a programming device for removable connection to said first processor for programming said first predetermined range of distances.

9. A system as defined in claim 1, additionally comprising:
    a control processor, wherein said control processor operates said apparatus for rotating a container.

10. A system as defined in claim 9, additionally comprising:
    an interface channel card for providing said first output signal to said control processor;

wherein said control processor is capable of accepting an output signal from another type of sensor in addition to said first output signal.

11. A system as defined in claim 9, additionally comprising:
   a reject mechanism for rejecting the container if said first output signal is indicative of the distance sensed by said first proximity sensor not being within said first predetermined range of distances.

12. A system as defined in claim 1, additionally comprising:
   a second proximity sensor positioned at a fixed location with respect to said inspection station for sensing the distance between said second proximity sensor and the container being inspected at the inspection station while the container is rotated; and
   a second processor that processes the distance sensed by said second proximity sensor and provides a second output signal that is indicative of whether or not the distance sensed by said second proximity sensor is within a second predetermined range of distances.

13. A system as defined in claim 12, wherein said first proximity sensor is oriented toward a first location on the surface of the container and said second proximity sensor is oriented toward a second location on the surface of the container that is different from said first location on the surface of the container.

14. A system as defined in claim 12, additionally comprising:
   a signal combiner for combining said first output signal and said second output signal, wherein said signal combiner produces either a first signal combiner output signal or a second signal combiner output signal, wherein said first signal combiner output signal is indicative of the distance sensed by said first proximity sensor being within the first predetermined range of distances and the distance sensed by said second proximity sensor being within the second predetermined range of distances, and wherein said second signal combiner output signal is indicative of either the distance sensed by said first proximity sensor not being within the first predetermined range of distances or the distance sensed by said second proximity sensor not being within the second predetermined range of distances.

15. A system as defined in claim 12, additionally comprising:
   at least one additional proximity sensor positioned at a fixed location with respect to said inspection station for sensing the distance between said at least one additional proximity sensor and the container being inspected at the inspection station while the container is rotated; and
   at least one additional processor that processes the distance sensed by said at least one additional proximity sensor and provides at least one additional output signal that is indicative of whether or not the distance sensed by said at least one additional proximity sensor is within at least one additional predetermined range of distances.

16. A system for automatically inspecting the roundness of containers, comprising:
   an apparatus for rotating a single container about an axis of the container, the single container being inspected at an inspection station;
   a first ultrasonic proximity sensor positioned at a fixed location with respect to said inspection station for sensing the distance between said first ultrasonic proximity sensor and the container being inspected at the inspection station while the container is rotated, said first ultrasonic proximity sensor being oriented orthogonally with respect to the axis of the container;
   a second ultrasonic proximity sensor positioned at a fixed location with respect to said inspection station for sensing the distance between said second ultrasonic proximity sensor and the container being inspected at the inspection station while the container is rotated;
   a programming device for removable connection to a first processor for programming a first predetermined range of distances for a specific type of container and for removable connection to a second processor for programming a second predetermined range of distances for the specific type of container;
   said first processor configured to process the distance sensed by said first ultrasonic proximity sensor and provide a first output signal that is indicative of whether or not the distance sensed by said first ultrasonic proximity sensor is within said first predetermined range of distances;
   said second processor configured to process the distance sensed by said second ultrasonic proximity sensor and provide a second output signal that is indicative of whether or not the distance sensed by said second ultrasonic proximity sensor is within said second predetermined range of distances; and
   a signal combiner for combining said first output signal and said second output signal, wherein said signal combiner produces either a first signal combiner output signal or a second signal combiner output signal, wherein said first signal combiner output signal is indicative of the distance sensed by said first ultrasonic proximity sensor being within the first predetermined range of distances and the distance sensed by said second ultrasonic proximity sensor being within the second predetermined range of distances, and wherein said second signal combiner output signal is indicative of either the distance sensed by said first ultrasonic proximity sensor not being within the first predetermined range of distances or the distance sensed by said second ultrasonic proximity sensor not being within the second predetermined range of distances.

17. A method of automatically inspecting the roundness of containers, comprising:
   rotating a single container about an axis of the container, wherein the container has a shoulder located between a body of the container and a neck of the container, the single container being inspected at an inspection station;
   sensing the distance between an ultrasonic proximity sensor positioned at a fixed location with respect to said inspection station, said sensor being oriented orthogonally with respect to the axis of the single container and oriented toward one of the shoulder of the container and at least one raised embossed logo of the container, and the container being inspected at the inspection station while the container is rotated; and processing the distance sensed by said proximity sensor and determining that the sensed distance between the sensor and the container is within a predetermined range of distances programmed into a processor for a container type being inspected and associated with the sensor for a specified duration and for providing an output signal that is indicative of whether or not the distance sensed by said proximity sensor is within the predetermined range of distances.

* * * * *